(12) United States Patent
Tal et al.

(10) Patent No.: US 7,774,772 B2
(45) Date of Patent: Aug. 10, 2010

(54) METHOD AND APPARATUS TO PERFORM AN APPLICATION SOFTWARE MIGRATION

(75) Inventors: Yoram Tal, Foster City, CA (US);
Ramzi Rabah, Hayward, CA (US);
Bryce Heung-Wing Yan, San Francisco, CA (US); Tony Kam Wong, San Francisco, CA (US)

(73) Assignee: Siebel Systems, Inc., San Mateo, CA (US)

( * ) Notice: Subject to any disclaimer, the term of this patent is extended or adjusted under 35 U.S.C. 154(b) by 604 days.

(21) Appl. No.: 09/968,556

(22) Filed: Sep. 28, 2001

(65) Prior Publication Data
US 2007/0245332 A1    Oct. 18, 2007

(51) Int. Cl.
*G06F 9/445* (2006.01)
(52) U.S. Cl. .................................... 717/172; 717/177
(58) Field of Classification Search ......... 717/168–178; 709/213
See application file for complete search history.

(56) References Cited

U.S. PATENT DOCUMENTS

| | | | | |
|---|---|---|---|---|
| 5,867,713 A * | 2/1999 | Shrader et al. | ............ | 717/176 |
| 5,870,611 A * | 2/1999 | London Shrader et al. | .. | 717/175 |
| 5,991,753 A * | 11/1999 | Wilde | ............................ | 707/2 |
| 6,047,323 A * | 4/2000 | Krause | ...................... | 709/227 |
| 6,370,646 B1 * | 4/2002 | Goodman et al. | ........... | 713/100 |
| 6,442,663 B1 * | 8/2002 | Sun et al. | .................... | 711/202 |
| 6,567,977 B1 * | 5/2003 | Kumar | ....................... | 717/174 |
| 6,654,830 B1 * | 11/2003 | Taylor et al. | ................. | 710/74 |
| 6,725,453 B1 * | 4/2004 | Lucas et al. | ................. | 717/178 |
| 6,938,039 B1 * | 8/2005 | Bober et al. | ................... | 707/8 |
| 2002/0010808 A1 * | 1/2002 | Wiggins et al. | ............ | 709/328 |

* cited by examiner

*Primary Examiner*—Chuck O Kendall
(74) *Attorney, Agent, or Firm*—Campbell Stephenson LLP

(57) ABSTRACT

A method and apparatus to perform a software migration. According to one embodiment of the invention, end-user specific platform information is collected to be used by a set of one or more migration scripts to perform the software migration. The migration scripts are to be executed on an end-user server and generate log files to be used to restart the software migration if an error occurs during the software migration.

20 Claims, 5 Drawing Sheets

METHOD AND APPARATUS TO PERFORM AN APPLICATION SOFTWARE MIGRATION

BACKGROUND OF THE INVENTION

1. Field of the Invention

The invention relates to the field of computing. More specifically, the invention relates to a method and apparatus to perform an application software migration.

2. Background of the Invention

An application software migration, that includes an application software installation or upgrade on an end-user server, is a tedious and time consuming process for the application software developer and application software end-user alike. This process from initial application software development to application software implementation on the end-user server involve many stages. Typically, this process starts with a multitude of software developers designing and writing application software source code relating to different facets of the end-product application software. In general, the application software source code includes multiple programming elements, such as, programs, scripts, procedures, triggers, packages, among others for example. These programming elements are kept resident in an application software source code library. An application software source code library helps manage the programming elements and prevent changes from being overwritten by multiple application software developers making changes.

This may occur, for example, when an application software developer checks out specific programming elements, in a way similar to how a library patron checks out a library book from a library. When an application software developer checks out a copy of a programming element, that application software developer is the only person who may make updates to the programming element at any one time. Without this mechanism, the application software developer risk having a later version of the programming element overwritten by an early, now, incomplete version. For example, if two application software developers make edits to a programming element at the same time, then the application software developer that saves the programming element last would be available and the previous modifications to the earlier saved programming element who be lost.

Another troublesome process of developing application software occurs when the application software source code is to be released. At this time, the application software source code is in various conditions of readiness. For example, the application software source code may contain various programming elements that are not yet production ready for the current release but will be further developed for future application software versions. Also, depending on whether the software migration is for an installation or an upgrade, the software source code may contain varying programming elements that the application software developer may or may not want to be included in the current release. That is, the application software source code library may contain prior, current, and future release programming elements that the application software developer may or may not want to include or have enabled in the version of the software product being shipped to end-users.

In addition, various migration scripts are included with the shipped product to provide user-friendliness to the software migration process. These migration scripts execute the necessary programming elements to perform the software migration on the end-user specific platform. The various end-user specific platforms depend on the end-user hardware, software operating system, database management system, and application software version. Typically, the software migration scripts are manually modified with end-user platform specific information to enable the software migration script to perform the software migration. For example, the migration script may be modified to include the location of various software directories on the end-user server; to include various operating system specific parameters; and/or to include a userid and password to the database management system.

For example, assume an end-user application runs on a Microsoft NT operating system platform and interfaces with a Microsoft SQL Server database. In this computing environment, the end-user would have to modify a software migration script to tailor the software upgrade with Microsoft NT and SQL Server specific parameters. In addition, if the migration script is generic and the migration script is not native to a Microsoft operating system, (e.g., the migration script is a Unix Korn script ), the migration script would need to be further modified to execute within Microsoft operating system, or a software emulation program would have to be included with the Unix migration script, which would allow the Unix migration script to execute in the Microsoft NT operating system environment.

Even here, problems occur when the end-user manually edits the migration scripts with the environment specific information before execution. Specifically, problems occur when end-users edit the migration scripts incorrectly or accidentally delete portions of the scripts. Therefore, editing the migration scripts may cause errors and delays to the implementation of the software migration.

Another troublesome circumstance occurs when errors arise during the software migration process. When the migration process encounters a fatal error, the migration process requires the entire installation process to be restarted. This is especially, troublesome if the migration process is lengthy. In some circumstances, the length of time to restart the migration process is further delayed because a database administrator must "reset" the database to a condition prior to the failed software migration process (e.g., perform a database load and dump). Depending on where the software migration failed, "resetting" the database to its previous condition may take hours.

In other situations, the entire migration process may complete, and it is not until the end-user views the log messages that it determines a fatal error has occurred. In this situation, cascading errors accumulating in the logs makes troubleshooting difficult. Errors in the migration process may also produce too many error logs. As a result, end-users have to sift through these files and compare any errors in them to a list of 'acceptable errors' that are provided.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

A method and apparatus to perform an application software migration is described. Specifically, a method and apparatus to perform an application software migration using a migration assembler during the software build stage and a migration orchestrator during the software migration stage is described. In general, the migration assembler is responsible for migration script creation and the migration orchestrator collects end-user platform specific information and executes the migration scripts as will be further described below.

Figure 1:
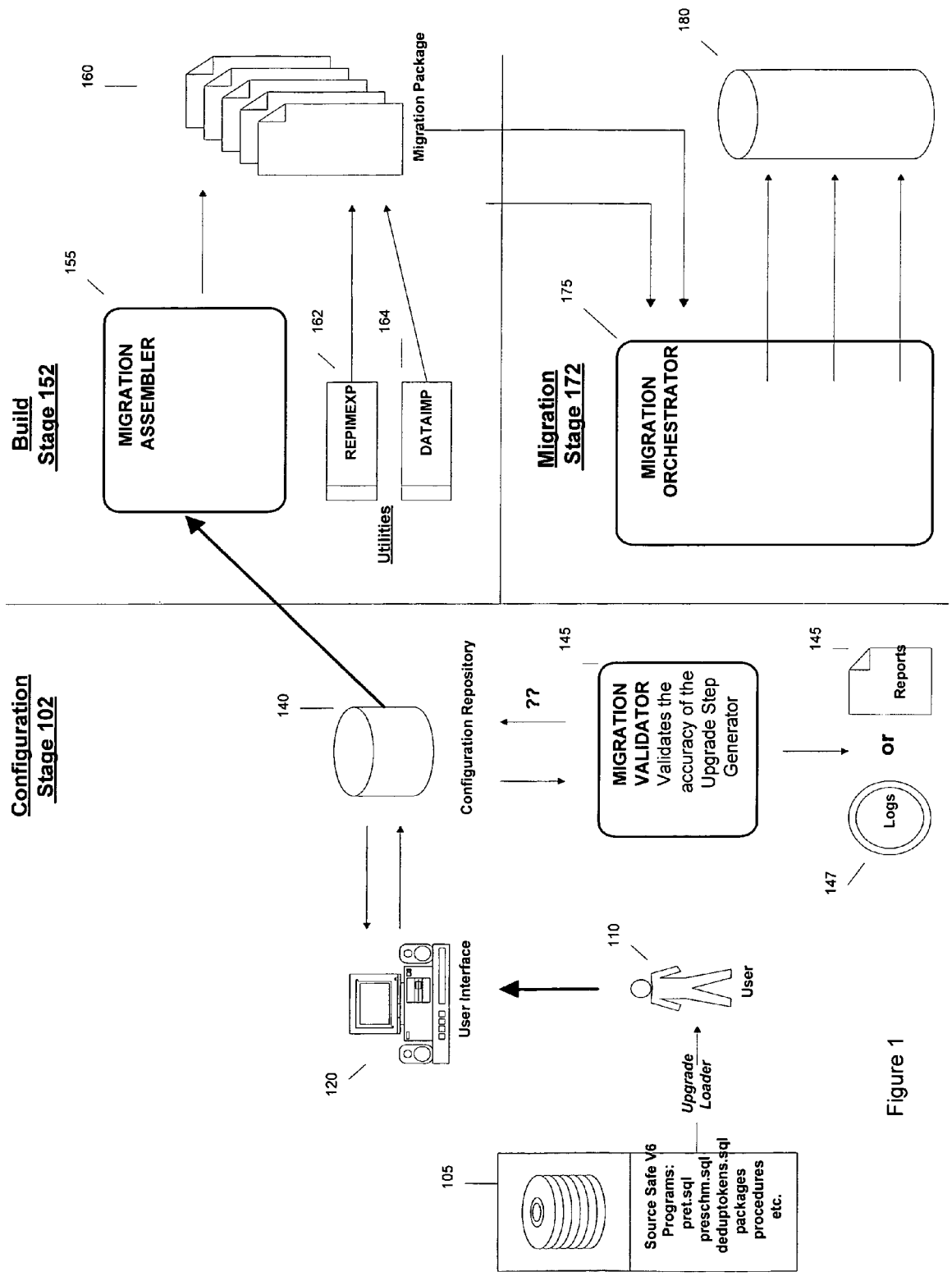
FIG. 1 illustrates an overview of the software migration process according to an embodiment.

FIG. 1 illustrates an overview of the software migration process according to an embodiment of the invention. Here, the figure is partitioned into 3 stages: a configuration stage 102, a build stage 152, and a migration stage 172. In the configuration stage 102, programming elements of the application software to be migrated to an end-user server are stored in a configuration repository 140. As illustrated in FIG. 1, an end-user 110 receives a copy of the programming elements to be modified from the application software source library 105 (herein referred to as Source Safe). For example, a programming element retrieved from the source safe 105 may be a database procedure, written in a standard query language (SQL), that inserts or removes specific database tables, columns, indexes, among other examples.

In one embodiment, programming elements that is to be enhanced is checked out of the source safe 105 and moved into the configuration repository 140. The configuration repository 140 may include programming elements from prior, current, and future versions of the application software to be migrated. The configuration repository 140 includes logic to allow multiple application software developers to check programming elements into and out of the configuration repository 140. In addition, in one embodiment, the configuration repository 140 includes metadata that describes the programming elements as will be further explained below.

After the migration repository is populated, a migration validator 145 validates the logical organization of the data stored in the configuration repository 140. In one embodiment the configuration repository has a logical data model with the programming elements logically organized into processes, phases, steps, and implementations, as will be further described below. Here, the migration validator 145 may be used to ensure that the data stored in the logical data model of the configuration repository 140 is accurate. For example, the migration validator 145 will ensure each migration process is associated with its multiple phases, that is associated with its multiple migration steps, what is associated with its multiple migration implementations. In one embodiment, the output of the migration validator 145 may be presented to an application software developer as either log files 147 or reports 148. It should be understood that although the invention has been described in relation to processes, phases, steps, and implementations other alternative hierarchies may be defined or none at all without limiting the scope of the invention.

In the build stage 152, the application software developer generates the migration scripts to be shipped to the end-user. Here, a migration assembler 155 selects the programming elements, stored in the configuration repository 140, which are to be included in the next version of the application software release. In this way, only the selected programming elements that are production ready are collected, thereby, eliminating the loading of non-production ready programming elements that would otherwise slow the migration process when applied to the end-user server. In one embodiment, all programming elements are not stored in the configuration repository 140, however, these programming elements are also packaged within the migration package. Repimexp 162 and Dataimp 164 are examples of utilities written in non-SQL code (e.g., binary code) that are not stored in the configuration repository 140 but are selected to be included with the migration package. Having received the necessary programming elements, the migration assembler builds a migration script for each platform to be stored in the migration package and migrated as will be further described below.

In the migration stage 172, a migration orchestrator 175 is used to collect end-user platform specific information and execute the migration scripts against an end-user server 180. As will be further described below, if a fatal error occurs during the execution of the software migration, the migration orchestrator 175 may restart the execution of the software migration from the point in which the fatal error occurred, thereby skipping the portion(s) of the migration script that was successfully executed. In this way, the software migration is efficiently performed.

Configuration Repository

Figure 2:
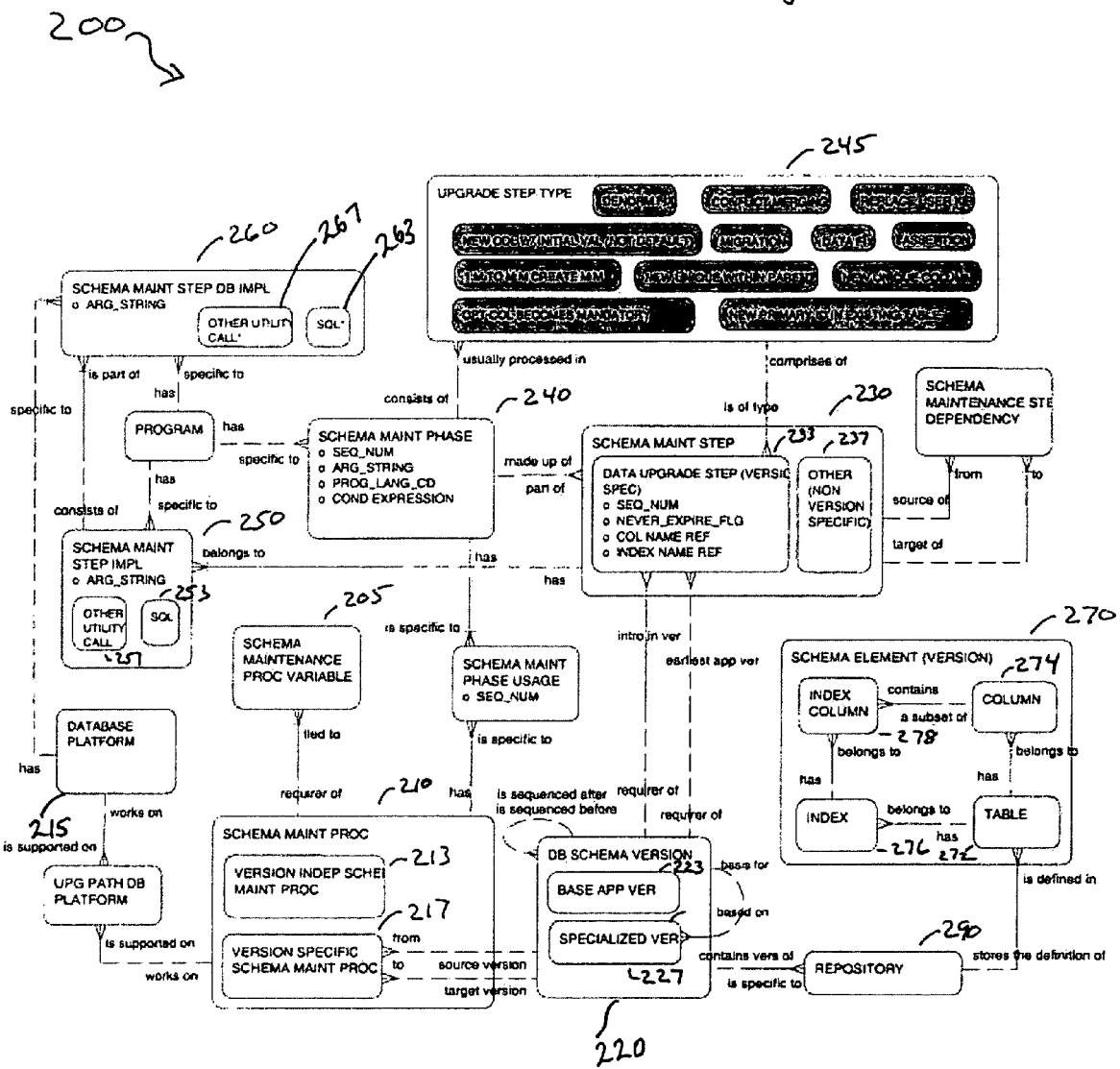
FIG. 2 illustrates a logical data model of the configuration repository according to an embodiment.

FIG. 2 illustrates a logical data model of the configuration repository according to an embodiment of the invention. Here, the configuration repository 200 stores the application software programming elements and associated metadata. In FIG. 2, the application software programming elements and associated metadata is organized into a hierarchy of entities represented by migration processes, phases, steps, and implementations as follows.

The Schema Maint Proc 210 entity includes metadata that describes the migration process type of the associated programming elements. Typically, a software migration may be described as install, upgrade, dev2prod, among other examples. For example, if the process type is an 'install' type then the associated programming element(s) and metadata is for an application software installation. If the process type is 'dev2prod' type then the associated programming element(s) and metadata is for a development version of the application software on a development server is migrated to a production server.

In one embodiment, the types of migration processes defined in the Schema Maint Proc 210 entity may include two subtypes: Version Indep Schema Maint Proc 213 and Version Specific Schema Maint Proc 217. Version Indep Schema Maint Proc 213 refers to generic processes types like 'Install'. Version Specific Schema Maint Proc 217 refers to the specific set of supported install and upgrade paths. In one embodiment, a variety of upgrade paths may be defined within the metadata. For example, the Version Specific Schema Maint Proc 217 may indicate the associated application source code needed for an application upgrade from version '6.01 to 7.0'.

The DB Schema Version 220 entity includes metadata that describes which application software version the programming elements are associated with. For example, a specific application software version may be version 5.0, version 6.0, or version 7.0. In one embodiment, the types of application versions defined in the DB Schema Version 220 entity include two subtypes: Base App Ver 223 and Specialized Ver 227. Base App Vers 223 (and some of Specialized Ver 227) refers to released versions of the application software. The Specialized Ver 227 is used to represent vertical upgrades. Since vertical product upgrades need to support a base horizontal upgrade to the vertical one.

The Schema Maintenance Phase 240 entity includes metadata that describes a logical grouping of migration steps within migration phases. For example, a migration phase describes a group of one or more migration steps, such as, 'Migration Steps Prior to Creating Tables' or 'Migration Steps Prior to Creating Indexes', among other examples. In one embodiment, metadata stored in the Schema Maintenance Phase 240 entity may be associated to one or more of the metadata records stored in the Schema Maintenance Procs 210 entity.

In one embodiment, the Schema Maintenance Phase 240 entity includes a sequence number, argument string, and condition expression. The sequence number in the Schema Maintenance Phase 240 entity defines the sequence in which a migration phase will be executed in a software migration script. The argument string defines the relationships between the migration phase and its associated group of migration steps. The condition expression is a conditional expression that the migration assembler uses during the build phase as will be further described below.

The Schema Maint Step 230 entity includes metadata that describes the migration steps to be performed for each migration phase. Each migration phase requires multiple steps to be performed in a specific sequence order. For example, if the migration process is an 'install' type and the migration phase is 'Migration Steps to Build a Customer Table' then the migration steps of may include (1) create customer table step; (2) create table columns step; (3) and create table index step; in this order sequence.

In one embodiment the migration step types defined in the Schema Maint Step 230 entity include two subtypes: Data Upgrade Step 233 and Generic Step 237. A Data Upgrade Step 233 is a logical unit of work that covers one schema change. A Data Upgrade Step 233 can have multiple implementations (dependent on the Database Platform 215), each of which may be implemented in one or more SQL statements. Generic Step 237 refers to Schema Maintenance Steps that are not version specific. These steps are generic and are included in the assembler regardless of version.

In one embodiment, the Data Upgrade Step 233 includes a sequence number, never expire flag, a column name reference, a index name reference and a table name reference. The sequence number defines the sequence in which the migration steps are implemented. The never expire flag for the Data Upgrade Step 233 will expire for migration from application software versions >=application software version in which the migration step was introduced, unless this flag is set to 'Y'. In one embodiment, the never expire flag is implemented because there are certain migration steps that always need to be run regardless of the application software version that is migrated from or to.

The Schema Maint Step Implementation 250 entity stores the migration implementation specific programming elements for a specific application software migration. Each migration step includes many lines of application source code to be implemented. In one embodiment, a sequence number of each SQL statement defines the sequence in which the different SQL statements described in Data Upgrade Step 233 are implemented.

In one embodiment, the Schema Maint Step Implementation 250 entity is separated into two subtypes: SQL code 253 and Utility Call 257. The SQL code 253 includes the implementation specific SQL code for the application software migration. The Utility Call 257 includes non-SQL calls to external applications. In one embodiment, the Utility Call 257 call includes 'skeleton' data that includes the name of a server file executable call and its command-line arguments. Here, the actual server file executable call is not stored in the configuration repository 200 data model, whereas, the SQL code is stored within SQL code 253.

The Schema Maint Step DB Implementation 260 entity includes non-uniform implementation source code. For example, if the SQL for a Oracle database and MS SQL Server database differ for a given implementation, then the Schema Maint Step DB Implementation 260 entity will store both implementations, whereas, if the SQL for a Oracle database and MS SQL Server database are the same for a given implementation, then the Schema Maint Step Implementation 250 will store the SQL. In one embodiment, the Schema Maint Step DB Implementation 260 entity includes two subtypes: SQL code 263 and Utility Call 267. The SQL code 263 includes the implementation specific SQL code for the application software migration. The Utility Call 267 includes the 'skeleton data as described above. Again, the non-SQL executable is stored external to the configuration repository 200 data model.

The Repository 290 entity includes metadata describing the type of database elements (e.g., tables, columns, indexes, etc) needed for the specific application software version indicated within DB Schema Version 220. Thereby, the Schema Element 270 entity includes metadata of these database elements. The database elements include Table 272, Column 274, Index 276, and Index Column 278 metadata.

Schema Maintenance Proc Variable 205 entity includes metadata describing end-user platform specific information. For example, for an Oracle database platform, the Schema Maintenance Proc Variable 205 entity stores metadata indicating that end-user platform specific information, such as, TABLSESPACE, INDEXSPACE, Username and password, among other examples, will be required. For a DB2 database platform, the Schema Maintenance Proc Variable 205 entity stores metadata indicating that end-user platform specific information, such as, 4K tablespace, 16 k tablespace, 32 k tablespace, among other examples, will be required.

Migration Assembler

Figure 3:
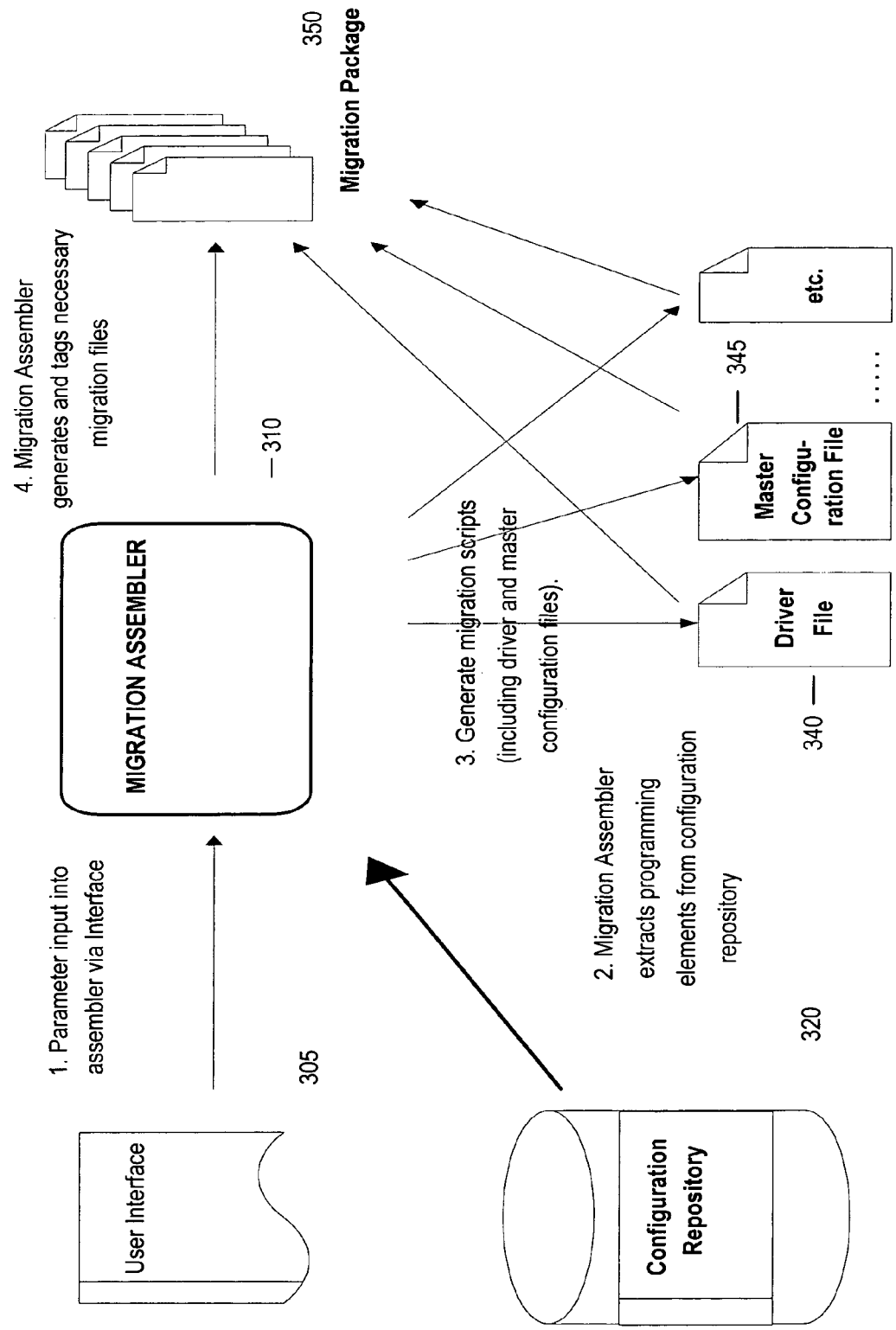
FIG. 3 illustrates the manner in which a migration assembler generates migration scripts according to an embodiment.

In the build stage 152, a migration assembler selects the necessary programming elements from the configuration repository, then generates and logically organizes migration scripts and files to be delivered to an end-user to perform a specific application software migration. FIG. 3 illustrates the manner in which a migration assembler generates migration scripts according to an embodiment of the invention. At stage 1, an application software developer uses a user interface 305 provided by the migration assembler 310 to indicate the programming elements to be extracted from the configuration repository 320. Here, the application software developer may use the user interface 305 to request the extraction of a specific migration process type, database version, migration phase, migration steps, and migration implementations from the configuration repository 320.

At stage 2, the migration assembler 310 interfaces with the configuration repository 320 and extracts the programming elements from the configuration repository 320 as requested by the application software developer though the user interface 305. In one embodiment, the migration assembler 310 extracts the programming elements by making a SQL call to the configuration repository 320. Here, the SQL results represents the programming elements to be migrated. However, it should be understood that alternative system calls may be made to extract the programming elements, such as, QUEL, QBE, RPC, etc.

At stage 3, the migration assembler 310 generates the migration scripts to perform a specific application software migration. Here, the migration scripts includes a driver file 340 and a master configuration file 345. The driver file 340 includes the migration steps that represent the conditional and logic flow of a specific software migration. In one embodiment, a separate driver file 340 is generated for each migration process and data base platform type combination. For example, the driver file for an 'install' migration process contains different migration steps than a driver file for an 'upgrade' migration process. In addition, a single driver file 340 may exist for each database platform (e.g. Oracle, MS SQL Server, IBM DB2, etc).

Given the migration process and the database platform type, the migration assembler 310 generates and logically organizes the driver file 340 with a series of the migration steps obtained from the configuration repository 320. In one embodiment, the migration steps obtained from the configuration repository 320 are ordered by the migration phase, steps, and implementation, as specified in the logically data model. As described above, metadata, such as, the migration phase and step sequence numbers allows the migration assembler to logically order the migration steps within the driver file.

In one embodiment, the driver file 340 includes a set of one or more SQL migration steps and server command line migration steps as described above. A SQL migration step is a SQL programming element (SQL, stored procedures, triggers, etc.) to be executed by the migration assembler. Here, the SQL migration step includes a SQL file name to be executed and a set of database parameters (e.g., table owner name, IgnoreAllDDLErrors flag, IgnoreAllDMLErrors flag, among other examples) used in executing the given SQL file.

The server command line migration step is executed by the end-user server command line file executable. Here, the server command line migration step includes a reference to a server program (e.g., binary program) to be executed, any command line arguments to be associated with the server program, and a set of database arguments (e.g., check return code flag, return code compliance flag, 16 Bit App flag, among other examples).

The migration assembler 310 also generates a master configuration file 345. In one embodiment, the master configuration file 345 includes a reference of end-user platform specific information needed for each driver file 340 to be executed on a specific end-user application platform. A different master configuration file 345 is generated, by the migration assembler 310, for each driver file 340 created. Therefore, a one-to-one correlation between a master configuration and a driver file exist.

In one embodiment, the master configuration file 345 will only include references of necessary end-user platform specific information. For example, the master configuration file 345 may include end-user platform specific information such as, database userid, database password, database table password, ODBC Data Source, Table Owner, application Root directory, Language, Index Space, Table Space, 8K Table Space flag, 16K Table Space flag, 32K Table Space flag, Database platform name, Database Server name, Database Owner name, application Version, Customer Repository Name, Customer Repository File, Database server Root directory, Ancestor Repository Name, Ancestor Repository File, Rollback Segment, Development flag (indicates whether the application is development or production), Keep All UpgWiz Files flag, Database Schema Process flag, Run Unattended flag, Log Directory, Log Events flag, among other examples.

In one embodiment, a specific master configuration file may include one or more of these end-user platform specific information examples depending on the migration process type and database version of the end-user platform. In this way, during the migration stage 172, the master configuration file 345 is referenced to determine which end-user platform specific information is necessary and should be collected from the end-user before performing the application software migration as will be further described below.

At stage 4, the migration assembler 310 generates necessary migration files with tags to the location to where the migration files should be stored during the Migration Stage 172. The migration files may include the necessary programming elements, SQL files containing code to build the necessary programming elements, and data files, among other examples. These migration files are stored in the migration package to be delivered to end-user. For example, SQL extracted from the configuration repository may be stored in a named SQL file and tagged with an indicator directing the named SQL file to be stored in a specific directory during the migration stage. In one embodiment, the configuration repository 320 also includes binary program files that are compiled, tagged, and placed in the migration package.

In one embodiment, the migration scripts and files are stored in a source safe. Here, the source safe would provide a repository for both the programming elements that are developed in the configuration repository 320 and those programming elements that are not developed in the configuration repository 320. For example, the configuration repository 320 may include SQL code and scripts which is transferred in the source safe by the Migration Assembler 310. The programming elements not included in the configuration repository 320 may include binary program code, for example, that is manually inserted in the source safe. In one embodiment, an ASCII makefile may be manually modified to include a list of all the required files in the source safe to be extracted into the migration package. Here, the makefile will ensure that the migration package has all the necessary files before delivering the migration package to the end-user.

In one embodiment, the migration package is placed in a file delivery mechanism. Examples of file delivery mechanism includes a CD-ROM, floppy disk, ftp server, among other examples. Here, the migration package is stored in a file delivery mechanism for delivery to an end-user.

Migration Orchestrator

Figure 4:
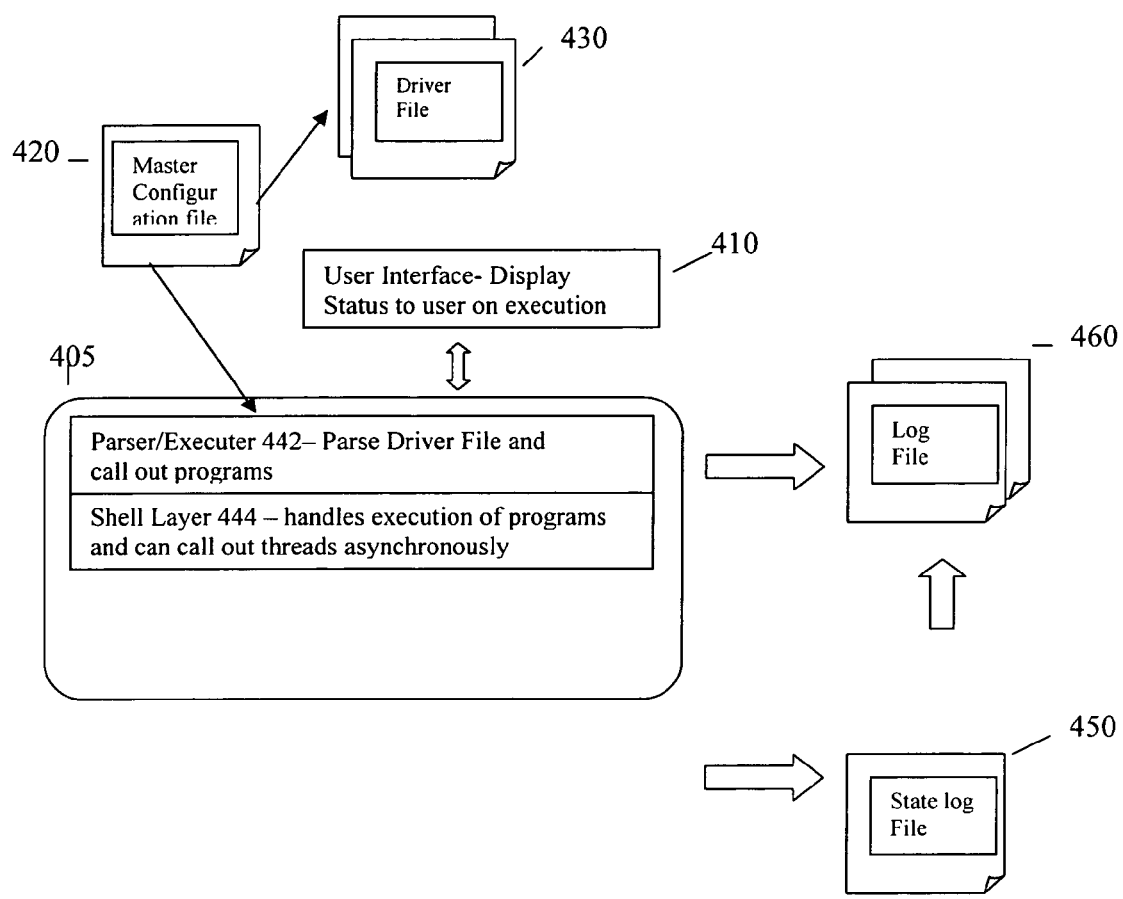
FIG. 4 illustrates the process of a typical software migration applied to a end-user server according to an embodiment.

FIG. 4 illustrates the process of a typical software migration applied to an end-user server according to an embodiment of the invention. Here, a migration orchestrator is used to execute migration scripts, from a migration package, to the end-user server. In one embodiment, a migration orchestrator collects end-user platform specific information and executes migration scripts to perform the software migration. In FIG. 4, the migration orchestrator 405 produces a user interface 410 to prompt the end-user for end-user information describing the migration process type to be performed (e.g., install, upgrade, etc) and the database platform. For example, the end-user may use the user interface 410 to choose to perform an install type migration process on a IBM DB2 database platform.

With this information the migration orchestrator 405 determines which master configuration file 420 and associative driver file 430 is to be used. As described above, in one embodiment, a master configuration file 420 and associative migration driver file 430 is created for each migration process type and database platform. Therefore, after the end-user provides the migration orchestrator 405 the migration process type and database platform, the migration orchestrator 405 determines what additional end-user specific information (e.g., user id, password, etc.) is required by the associated driver file 430 from the appropriate master configuration file 420. That is, the migration orchestrator 405 prompts the end-user from the user interface 410 for the necessary end-user platform specific information defined in the specific master configuration file 420 for the migration process type and database platform given.

In this way, the end-user need not risk potential migration errors due to modifying the migration scripts as described in the background. In one embodiment, the migration orchestrator 405 will only execute those portions needed to perform the software migration. This is because, during the build stage, the migration assembler organized the master configuration and driver files to only perform the migration steps needed to perform a software migration for a specific migration process type and database platform. In this way, in one embodiment, the migration orchestrator 405 is not responsible for the migration logic. The migration orchestrator 405 merely selects the master configuration and driver files and executes the software migration as described below.

In one embodiment, the migration orchestrator extracts and stores in a specific directory the appropriate migration files in a server file directory. However, in alternative embodiments, the extraction and storing of migration server files in a directory may be performed before the end-user platform specific information is collected.

Upon receiving the end-user specific information, the migration orchestrator 405 provides it to the associative migration driver file 430 of the associative master configuration file. The migration orchestrator 405 then executes the migration steps defined in the migration driver file 430 against the end-user server. In one embodiment, the migration orchestrator 405 includes a parser/executer 442 to parse and execute the SQL and server command line migration steps defined in the driver file 430. The migration orchestrator 405 also includes a shell layer 444 that handles execution of the programs and calls out threads asynchronously. Therefore, the migration orchestrator 405 may execute the migration steps in background or in parallel, to optimize execution speed. Also, in one embodiment, both the parser/executer 442 and shell layer 444 operate accordingly regardless of the server operating system in use (e.g., Window NT, Unix, among other examples).

The migration orchestrator 405 also generates software migration log messages. Log messages are used to provide status information of the software migration to the end-user. In one embodiment, the software migration status information is stored in the driver log file 460 and state log file 450 and/or provided to the user interface 410. The driver log file 460 includes detailed status information of each migration step performed during the software migration. The state log file 450 includes a summary status of each migration step performed during the software migration. In one embodiment, the summary status indicates whether the migration step executed was successful or failed. For example, upon execution of a SQL migration step or server command line step within the driver file 430, the migration orchestrator 405 will write out to the state log file 450 a message describing whether the step was successfully executed (e.g., "Step 1: successful"; "Step: 3 failed"; "Step 4: incomplete").

In one embodiment, the migration orchestrator 405 allows the end-user to determine the types of messages to log. By way of example, the end-user may toggle whether to capture "acceptable errors" to the log file and user interface 410. Acceptable errors are non-fatal errors which do not interrupt execution. In this way, the end-user may eliminate the multitude of messages to the logs to provide better readability.

In one embodiment, migration orchestrator 405 will use the state log file 450 to restart a failed software migration from the point the migration failed. By way of example, assume the software migration was halted because of a fatal error. The fatal error may have occurred because of a failed network connection, the database logs were full, among other examples. When the cause of the fatal error has been resolved (e.g., network connection is resumed, database log files are extended, among other examples), the end-user uses the migration orchestrator 405 to execute the migration scripts a second time. In one embodiment, the migration orchestrator 405 searches for the state log file 450. If the state log file 450 exists, the migration orchestrator 405 will parse the state log file 450, searching for the migration step that was performed at the time of the fatal error. In one embodiment, the migration step that was performed at the time of the fatal error is the point in which the migration is to restart. Having identified the migration step that was unsuccessful, the migration orchestrator 405 then scans the selected migration driver file 430 for the location of this migration step and restarts the software migration from this point. In one embodiment, if multiple migration steps are executed in parallel, then migration orchestrator 405 will scan the state log file 450 and store the successful states in a memory. The migration orchestrator 405 will then parse the driver file 403 and only execute those migration steps that were not successful. In this way, the duration of a restarted software migration is shorten because the software migration need not be restarted from the beginning.

It should be appreciated that the embodiments described to perform a software migration, allows for improved organization of programming elements during the development of the future versions of application software. As described the migration assembler allows an application software developer to select only those programming elements which are required for a specific software migration. As described, the migration orchestrator limits the possibility of end-user error by minimizing problems that may occur when an end-user provides end-user specific platform information to the migration scripts. In addition, the restart time of the migration script is shortened by using the state log to identify the last successful migration step and continuing execution for that point. In these ways, among others, the software migration is more efficient.

It should be understood that although the invention has been described as having a migration orchestrator collect end-user platform specific information and execute the migration scripts to the end-server server, in alternative embodiments, one or more applications may perform these and other tasks without limiting the scope of the invention.

The techniques shown in the figures can be implemented using code and data stored and executed on computers. Such computers store and communicate (internally and with other computers over a network) code and data using machine-readable media, such as magnetic disks; optical disks; random access memory; read only memory; flash memory devices; electrical, optical, acoustical or other form of propagated signals (e.g., infrared signals, digital signals, etc.); etc. Of course, one or more parts of the invention may be implemented using any combination of software, firmware, and/or hardware.

Figure 5:
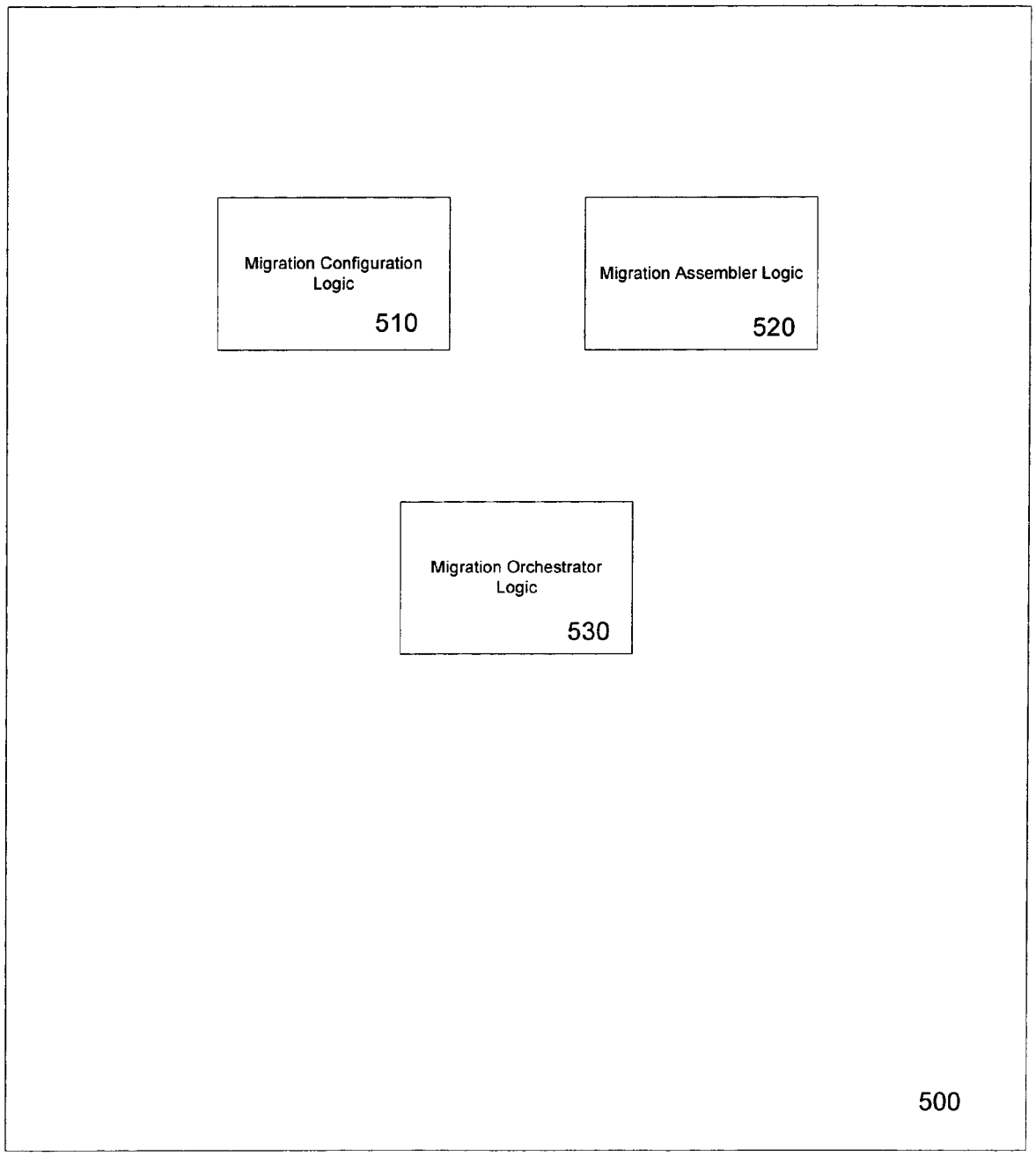
FIG. 5 illustrates a medium or media useful for an embodiment of a process to perform an application software migration.

FIG. 5 illustrates a medium or media useful for an embodiment of a process to perform an application software migration. Each of the blocks of medium 500 may be implemented separately or in combination with other blocks and not all blocks need be implemented. Block 510 includes migration configuration logic which may be used to generate a configuration repository comprising logically organized migration programming elements. Block 520 includes migration assembler logic which may be used to select programming elements to be inserted into migration scripts for a migration package. Block 530 includes migration orchestrator logic that applies the migration package to a specific end-user server.

Some portions of the detailed description are presented in terms of algorithms and symbolic representations of operations on data bits within a computer memory. These algorithmic descriptions and representations are the means used by those skilled in the art to most effectively convey the substance of their work to others skilled in the art. An algorithm as described here is generally conceived to be a self consistent sequence of acts or operations leading to a desired result. The acts are those requiring physical manipulations of physical quantities. Usually, though not necessarily, these quantities take the form of electrical or magnetic signals capable of being stored, transferred, combined, compared and otherwise manipulated. It has proven convenient at times principally for reasons of common usage to refer to these signals as bits, values, elements, symbols, characters, terms, numbers, data or the like.

It should be borne in mind, however, that all of these in similar terms are to be associated with the appropriate physical quantities and are merely convenient labels applied to these quantities. Unless specifically stated otherwise as apparent from the following discussion it is appreciated that throughout the description discussions utilizing terms such as "processing" or "computing" or "calculating" or "determining" or "displaying" or the like refer to the action and processes of a computer system or similar electronic computing device that manipulates and transforms data represented as physical (electronic) quantities within the computer systems registers and memories into other data similarly represented as physical quantities within the computer system memories or registers or other such information storage transmission or display devices. The present invention can be implemented by an apparatus for performing the operations herein. This apparatus may be specially constructed for the required purposes or it may comprise a machine such as a general purpose computer selectively activated or reconfigured by a computer program (such as a collection of instructions for execution by a machine or processor for example) stored in the computer. Such a computer program may be stored in a computer readable storage medium such as but not limited to any type of disk including floppy disks, optical disks, CD ROMs and magnetic optical disks, read only memories, random access memories, EPROMS, EEPROMS, magnetic or optical cards or any type of media suitable for storing electronic constructions and each coupled to a computer system bus. Each of these media may be coupled to a computer system bus through use of an appropriate device for reading and or writing the media in question. Specialty apparatus may include a collection of readily available pieces or an application specific integrated circuit including a series of logic blocks for example. The blocks of FIG. 1, 3, or 4 may be suitable for implementation as logic blocks, as may other configurations of the method, system and apparatus described herein.

The algorithms and displays presented herein are not inherently related to any particular computer or other apparatus. Various general purpose systems may be used with programs in accordance with the teachings herein or it may prove convenient to construct more specialized apparatus to perform the required method. For example, any of the methods according to the present invention can be implemented in hard wired circuitry by programming a general purpose processor or by any combination of hardware and software. One of skill in the art will immediately appreciate that the invention can be practiced with computer system configuration. Configurations other than those described below including hand held devices, multi processor systems, microprocessor based or programmable consumer electronics, network PCs, mini computers, main frame computers and the like. The invention may also be practiced in distributed computing environments or tasks or performed by remote processing devices that are linked through a communications network. The required structure for a variety of these systems will appear from the description below.

The methods of the invention may be implemented using computer software. If written in a programming language conforming to a recognized standard sequences of instructions designed to implement the methods can be compiled for execution on a variety of hardware platforms or machines and for interface to a variety of operating systems. In addition the present invention is not described with reference to any particular programming language. It will be appreciated that a variety of programming languages may be used to implement the teachings of invention as described herein. Furthermore, it is common in the art to speak of software in one form or another (for example program procedure application etc . . . ) as taken in action or causing a result. Such expressions are merely a shorthand way of saying that execution of the software by a computer causes the processor of the computer to perform an action or produce a result.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A method comprising:
   collecting information about a specific platform;
   based on the collected information, selecting a first subset of a plurality of subsets of migration scripts, wherein the first subset of migration scripts, when executed, performs a software migration to a platform that comprises a first database system, and wherein a second subset of the plurality of subsets, when executed, performs a software migration to a platform that comprises a second database system, wherein the first and second database systems are distinct from each other;
   performing a software migration to the specific platform by executing the selected first subset of migration scripts in a sequential order;
   if a fatal error occurs during the software migration to the specific platform, re-executing some but not all of the first subset of migration scripts.

2. The method of claim 1 where the first subset of migration scripts comprises a plurality of programming elements, the plurality of programming elements to be extracted from a migration package.

3. The method of claim 2 where the executing comprises executing the plurality of programming elements in the first subset set of migration scripts in a particular sequence order.

4. The method of claim 1 where the first subset of migration scripts comprises a master configuration file and a driver file.

5. The method of claim 1 where the first subset of migration scripts to execute is determined by a particular migration process type.

6. The method of claim 1 further comprising:
during the software migration, generating a log file, wherein the re-executing comprises:
scanning the log file for a migration step with an error state;
scanning the first subset of migration scripts corresponding to the migration step; and
re-executing the first subset of migration scripts.

7. The method of claim 6 where the log file comprises state information that comprises a success migration state, an incomplete migration state, or an error migration state.

8. An apparatus comprising:
a memory that stores a plurality of subsets of migration scripts wherein a first subset of the plurality of subsets, when executed, performs a software migration to a platform that comprises a first database system, and wherein a second subset of the plurality of subsets, when executed, performs a software migration to a platform that comprises a second database system, wherein the first and second database systems are distinct from each other;
a first circuit for selecting a subset of the plurality of subsets of migration scripts based on information about a specific platform;
a second circuit for executing the selected subset of migration scripts in order to perform a software migration to the specific platform; and
wherein the second circuit is configured to re-execute some but not all of the selected subset of migration scripts if the software migration fails as a result of an error.

9. The apparatus of claim 8 where the selected subset of migration scripts comprises a plurality of programming elements, the plurality of programming elements to be extracted from a migration package.

10. The apparatus of claim 9 where the second circuit is configured to execute the plurality of programming elements in the selected subset of migration scripts in a particular sequence order.

11. The apparatus of claim 9 where the second circuit is configured to execute two or more of the plurality of programming elements in parallel.

12. The apparatus of claim 8 where the selected subset of migration scripts comprises a master configuration file and a driver file.

13. The apparatus of claim 8 where the selected subset of migration scripts to execute is determined by a particular migration process type.

14. The apparatus of claim 8 wherein the second circuit is configured to generate a log file that comprises state information of the software migration, and wherein the second circuit is configured to:
scan the log file for a migration step with an error state;
scan the selected subset of migration scripts corresponding to the migration step.

15. A machine-readable medium comprising instructions, which when executed by one or more processors, implements a method comprising:
collecting information about a specific platform;
based on the collected information, selecting a first subset of a plurality of subsets of migration scripts wherein the first subset of migration scripts, when executed, performs a software migration to a platform that comprises a first database system, and wherein a second subset of the plurality of subsets, when executed, performs a software migration to a platform that comprises a second database system, wherein the first and second database systems are distinct from each other;
performing a software migration to the specific platform by executing the selected first subset of migration scripts in a sequential order;
if a fatal error occurs during the software migration on the specific platform, re-executing some but not all of the first subset of migration scripts.

16. The machine-readable medium of claim 15 where the first subset of migration scripts comprises a plurality of programming elements, the plurality of programming elements to be extracted from a migration package.

17. The machine-readable medium of claim 16 where the executing comprises executing the plurality of programming elements in the first subset of migration scripts in a particular sequence order.

18. The machine-readable medium of claim 16 where the first subset of migration scripts comprises a master configuration file and a driver file.

19. The machine-readable medium of claim 15 where the method further comprises generating a log file during the software migration, and wherein re-executing comprises:
scanning the log file for a migration step with an error state;
scanning the first subset of migration scripts corresponding to the migration step; and
re-executing the first subset of migration scripts.

20. The machine-readable medium of claim 15 where the log file comprises state information that comprises a success migration state, an incomplete migration state, or an error migration state.

* * * * *

UNITED STATES PATENT AND TRADEMARK OFFICE
CERTIFICATE OF CORRECTION

| | | |
|---|---|---|
| PATENT NO. | : 7,774,772 B2 | Page 1 of 1 |
| APPLICATION NO. | : 09/968556 | |
| DATED | : August 10, 2010 | |
| INVENTOR(S) | : Yoram Tal et al. | |

It is certified that error appears in the above-identified patent and that said Letters Patent is hereby corrected as shown below:

In column 2, line 17, delete "script )," and insert -- script), --, therefor.

In column 6, line 37, delete "TABLSESPACE," and insert -- TABLESPACE, --, therefor.

Signed and Sealed this
Tenth Day of May, 2011

David J. Kappos
*Director of the United States Patent and Trademark Office*